May 23, 1967   L. E. JOHNSON ET AL   3,321,179
GAS TURBINE ENGINES
Filed Sept. 13, 1965   3 Sheets-Sheet 1
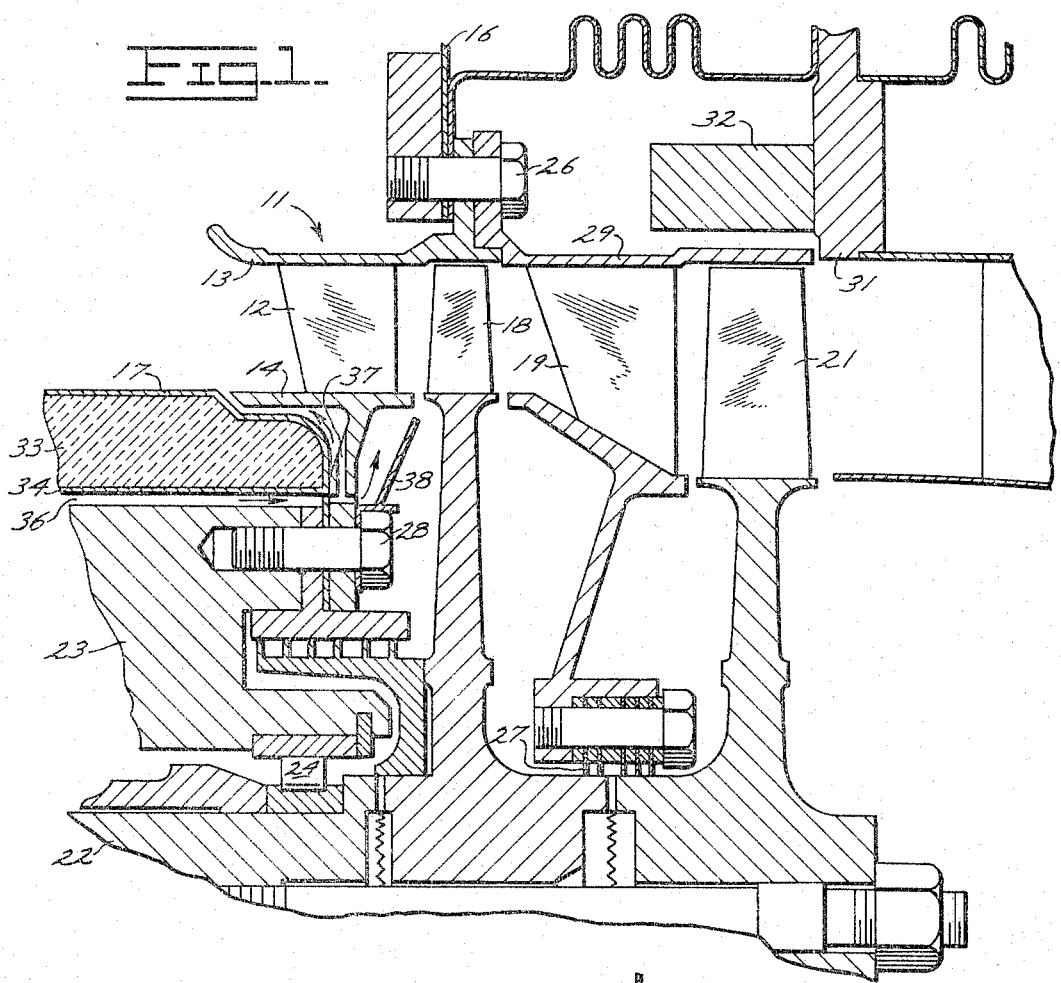
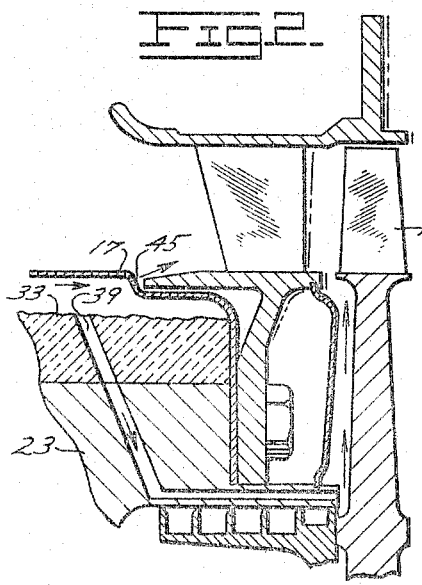
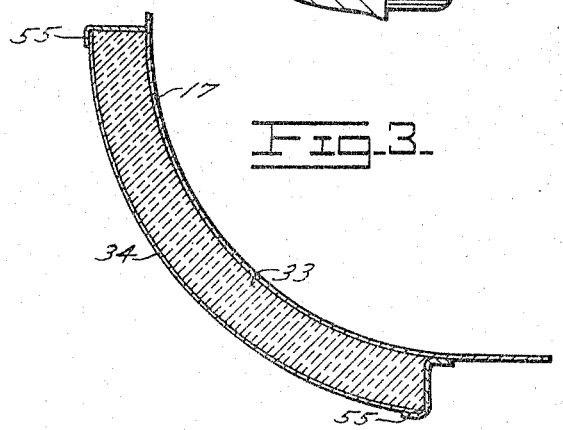
INVENTORS
LLOYD E. JOHNSON
KENNETH D. PROBERT
BY FRANKLIN E. ZIMMERMAN
ATTORNEYS

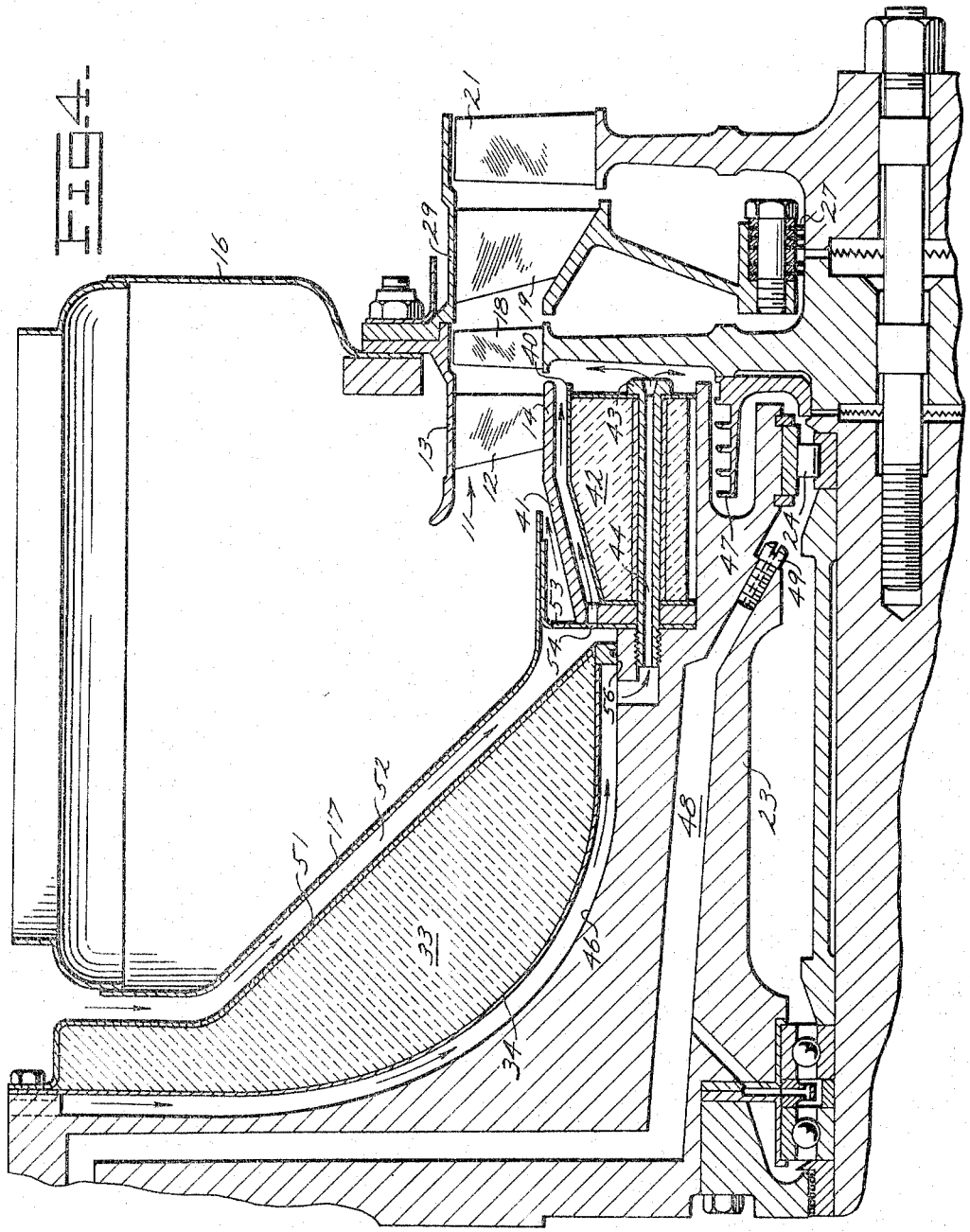

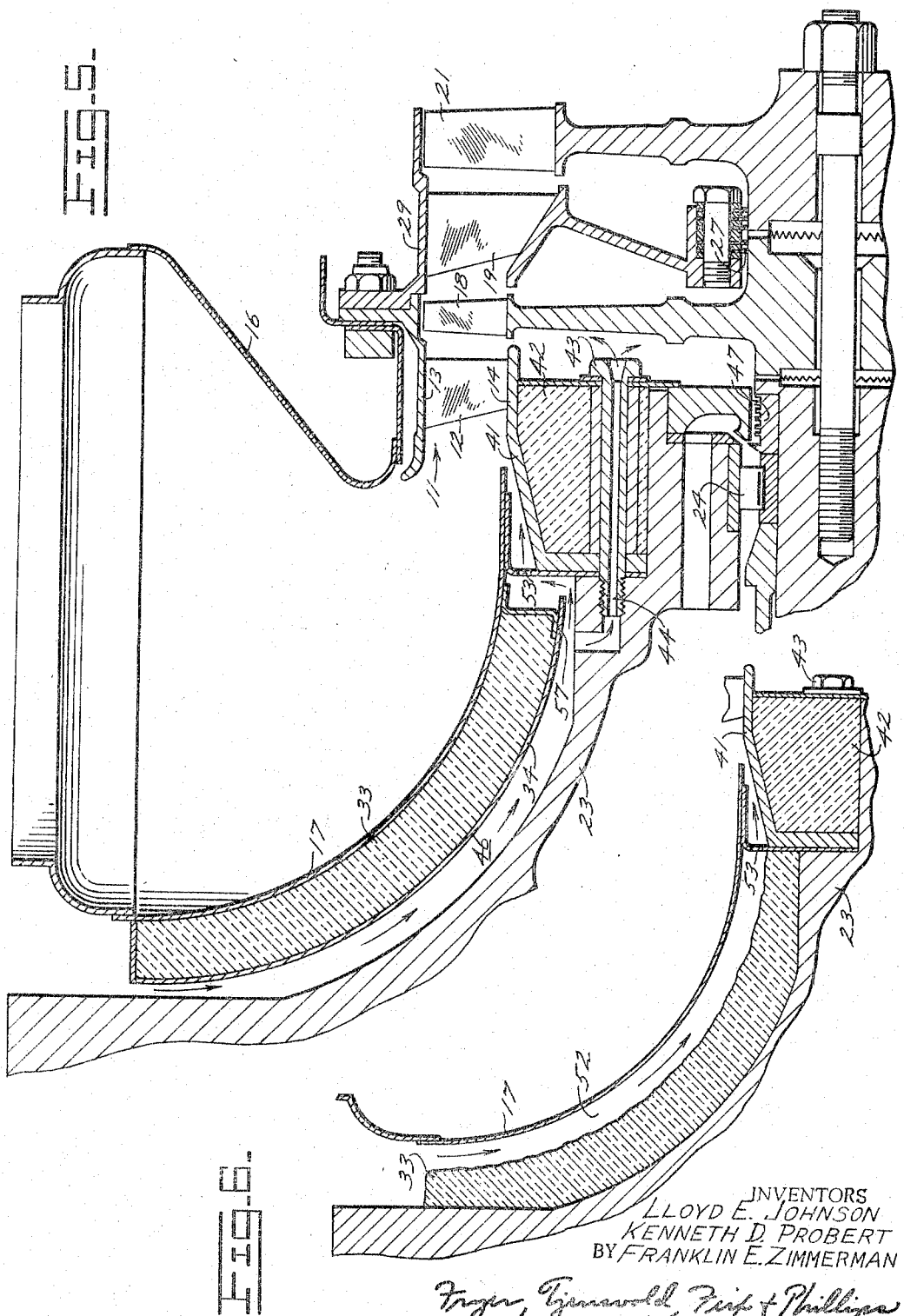

3,321,179
GAS TURBINE ENGINES
Lloyd E. Johnson, East Peoria, Kenneth D. Probert, Peoria, and Franklin E. Zimmerman, Pekin, Ill., assignors to Caterpillar Tractor Co., Peoria, Ill., a corporation of California
Filed Sept. 13, 1965, Ser. No. 486,689
3 Claims. (Cl. 253—39.1)

This invention relates to a nozzle assembly for the turbine inlet of a gas turbine engine.

The turbine inlet nozzle assembly is one component of a gas turbine engine which is subjected to large and rapid temperature changes during certain phases of operation of the gas turbine engine. The turbine nozzles must be retained in their operative position, but any excessive restraints on thermal growth can cause problems of distortion and cracking.

It is a primary object of the present invention to mount the turbine nozzle assembly in a way that maintains the close running clearances required for efficiency and yet permits sufficient relocation during thermal growth to prevent restraining stresses that could cause cracking.

In a preferred form of the present invention the nozzle assembly is held in position by a cone-shaped member which has an axially extending thin-walled section providing a flexible cantilever support from the engine frame.

The present invention also provides effective heat shielding between the bearings of the engine, which are required to run at relatively low temperatures, and the high temperature scroll and nozzle assembly. This heat shielding is accomplished by the location of insulators and cooling air passageways between the scroll-turbine nozzle structure and the frame and bearing structure of the engine. The specific ways in which this heat shielding is accomplished constitute further objects of the present invention.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

In the drawings:

FIG. 1 is a fragmentary cross-section view of a turbine nozzle assembly constructed in accordance with one embodiment of the present invention;

FIG. 2 is a fragmentary view of a nozzle assembly like that shown in FIG. 1 but which includes a modified form of insulation and ducting for coling air flow;

FIG. 3 shows an alternative form of insulation which can be used with the nozzle assembly shown in FIGS. 1 and 2;

FIG. 4 is a fragmentary cross-sectional view showing a nozzle assembly constructed in accordance with another embodiment of the present invention;

FIG. 5 is a fragmentary cross-sectional view of a turbine nozzle assembly constructed in accordance with another embodiment of the present invention; and FIG. 6 is a fragmentary view showing a modified form of insulation which can be used with the nozzle assembly shown in FIG. 5.

A turbine nozzle assembly constructed in accordance with one embodiment of the present invention is indicated generally by the reference numeral 11 in FIG. 1. The nozzle assembly 11 includes circumferentially spaced nozzle vanes 12 which are attached at their outer ends to a hoop 13. The vanes 12 are attached at their inner ends to a hoop 14.

Hot gases from the combustion chamber flow to the guide vanes 12 from an inlet scroll. A portion of the outer wall 16 and the inner wall 17 of the scroll are shown in FIG. 1.

The nozzles 12 direct the hot gases to a first stage turbine 18. After leaving the first stage turbine, the hot gases pass through a second set of nozzle vanes 19 and a second stage turbine 21.

The two turbines 18 and 21 are connected to drive a shaft 22 which is mounted for rotation in a bearing 24 in the main frame 23.

The second stage nozzles 19 are connected for support from the nozzle assembly 11 by means of bolts 26.

A rotary seal 27 prevents leakage of gas between the second stage nozzle assembly and the hubs of the turbine wheels 18 and 21.

The primary support for the nozzle assembly 11, and the attached second stage nozzle 19 is provided by a bolted connection 28 to the main frame 23.

This connection is sufficiently rigid to maintain the desired close tolerances between the rotating parts; however, it is sufficiently flexible to permit some axial displacement, as best shown by the phantom outlines in FIG. 2, to permit some part relocation as a result of thermal expansion and aerodynamic loads. The amount of the axial displacement is limited by engagement of the end of the outer hoop 29 of the second stage turbine nozzles with a stop 31 which is fixed to the outer shell of the engine.

A blocking ring 32 is also mounted on the stop 31 so as to encircle the second stage turbine 21 and offer protection against any failure of the second stage turbine.

Although not shown in FIG. 1, the wall 16 of the scroll may preferably be formed with a flexible curve so as to offer little restraint to relocation of the elements of the turbine nozzle assembly.

With the support arrangement shown in FIG. 1 it is important that the thicknesses of the outer hoop 13 and inner hoop 14 be restricted to prevent the development of excessive compresive loads produced by expansion of the vanes 12. In this regard, it may be noted that the thickness of the outer hoop 13 is reduced across the width of the vanes 12.

The bearing 24 must be shielded from the high temperatures developed in the turbine nozzle assembly 11 to prevent excessive bearing temperatures. In accordance with the present invention the heat shielding is accomplished by a combination of fixed insulation and cooling air passageways.

In the embodiment ilustrated in FIG. 1 a jacket of insulating material 33 is held in positon about the frame 23 by the inner wall 17 of the scroll and an additional wall 34. The wall 34 is radially spaced from the frame 23 to provide a cooling air passageway 36. This cooling air is directed outwardly and to the upstream end of inner hoop 14 and to the turbine nozzles 12 by a passageway 37. A deflector 38 disposed at the outlet end of the passageway 36 deflects the cooling air to the downstream end of inner hoop 14 and to the inner ends of the blades 18 of the first stage turbine.

In a modified form of the turbine nozzle assembly shown in FIG. 2 the insulation 33 is molded directly onto the frame 23. In this case the inner wall 17 of the scroll may be spaced from the blanket 33 so as to provide a passage for cooling air, and an additional passageway 39 is used to conduct cooling air to the base of the first stage turbine 18. Cooling air may also be directed along the outer wall of hoop 14 through a port 45.

A third form of an insulator for insulating the main frame 23 from the scroll is shown in FIG. 3 and will be described in greater detail below with reference to FIG. 5.

With reference now to FIG. 4 another form of mounting for the nozzle assembly 11 is illustrated. In this form of the invention the nozzle assembly is held in position by a generally cylindrically-shaped member 41 comprising axially extending thin-walled conical and cylindrical sections providing a flexible cantilever support from the engine frame 23. This extended nozzle mounting member 41 is formed integral with the inner hoop 14 and has been found quite effective in allowing relative thermal expansion of the nozzle assembly components and to prevent restraining stresses that could cause cracking during the thermal expansion produced by rapid increases in temperature in the different parts of the nozzle assembly.

The frame 23, in the embodiment illustrated in FIG. 4, is recessed beneath the cylindrically-shaped member 41 to provide space for a ring of insulation 42. Both the ring 42 and the cylindrically-shaped member 41 are mounted on the frame 23 by circumferentially spaced bolts 43. As illustrated in FIG. 4 the bolts 43 may be drilled with internal passageways 44. The passageways 44 permit cooling air to be directed from a channel 46, located between the insulation 33 and the frame 23, to the base of the turbine wheel 18. This also provides fuel-free cool air to pressurize the gas seal 47 between the frame 23 and the turbine wheel 18 to prevent leakage of lubricant from the bearing 24.

As illustrated in FIG. 4 the frame 23 is provided with a passage 48 and a jet 49 for conducting lubricating oil to the bearing 24.

The heat barrier 33 in the embodiment illustrated in FIG. 4 is self-contained between an inner wall 34 and an outer wall 51 which is separate from and spaced slightly rom the inner wall 17 of the scroll. This construction provides an additional cooling air passageway 52. Cooling air from this passageway is conducted through orifices 53 and along the top surface of the cylindrically-shaped member 41 to the inner ends of the nozzle blades 12. Air from the pasageway 52 is also conducted through orifices 54 and along the underside of the cylindrically-shaped member 41 to the base of the blades of the turbine wheel 18.

In FIG. 5 another embodiment of the cylindrical nozzle mount is illustrated. The embodiment illustrated in FIG. 5 differs from that described above with reference to FIG. 4 primarily in the form of the heat barrier 33 and some related cooling air passageways.

In the embodiment shown in FIG. 5 the insulation barrier 33 is sandwiched between the inner wall 17 of the scroll and the inner wall 34 of the heat barrier and the entire assembly is attached to the scroll rather than to the main frame 23, as in the case of the embodiment shown in FIG. 4. The heat barrier construction shown in FIG. 5 retains a cooling air passageway 46 between the frame 23 and the barrier. The cooling air from this passageway is directed through an orifice 53 along the top side of the cylindrical member 41 to the inner ends of the nozzle blades 12. Air from the passageway 46 is also conducted through the passageways 44 in the bolts 43 in the same manner as described above in reference to FIG. 4.

The accentuated curvature of the wall 16 of the scroll provides a more flexible attachment to the nozzle assembly 11.

The heat barrier 33 shown in FIG. 6 is molded directly on the engine frame 23, as in the case of the embodiment illustrated in FIG. 2, and a cooling air passageway 52 is provided between the barrier 33 and the inner wall 17 of the scroll. In the case of the embodiments shown in both FIGS. 5 and 6 the insulating ring 42 is mounted flush in the pocket defined between the cylindrically-shaped member 41 and the bearing frame without any separate wall member like the wall member 40 illustrated in FIG. 4.

To prevent wall distortion that otherwise might occur with a rigid container construction confining heat barrier 33, floating joints are provided at 55 (FIG. 3), at 56 (FIG. 4), and at 57 (FIG. 5). These floating connections relieve the strain imposed by the heat differential.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:
1. An annular nozzle assembly for the turbine inlet of a gas turbine engine comprising, a plurality of circumferentially spaced radially extending nozzles and inner and outer hoops attached to the ends of the nozzles, mounting means providing a flexible mounting for the nozzle assembly to accommodate differential thermal expansion of the nozzle assembly components produced by temperature changes during operation of the engine, said mounting means including a generally cylindrically-shaped member integral with the inner hoop at one end and connected to the engine frame at the other end to provide a primary support which is effective to permit relative thermal expansion of nozzle assembly components and to prevent restraining stresses that could cause cracking, a stop fixed to the outer shell of the engine and located to permit a limited axial movement of the nozzle assembly before the outer hoop engages the stop to thereby permit some part relocation in an axial direction as a result of thermal expansion and aerodynamic loads, a blocking ring connected to the stop and encircling a turbine wheel associated with the nozzle, said nozzle assembly including an engine frame mounting a turbine shaft bearing inward of the nozzle assembly and having an annular recess beneath the cylindrically-shaped member and a ring of insulation mounted in the recess beneath the cylindrically-shaped member between the nozzle assembly and the bearing, and a plurality of circumferentially spaced bolts connecting the ring of insulation and the cylindrically-shaped member and drilled to provide passageways for directing cooling air through the bolts and to the base of the adjacent turbine wheel.

2. An annular nozzle assembly for the turbine inlet of a gas turbine engine comprising, a plurality of circumferentially spaced radially extending nozzles and inner and outer hoops attached to the ends of the nozzles, mounting means providing a flexible mounting for the nozzle assembly to accommodate differential thermal expansion of the nozzle assembly components produced by temperature changes during operation of the engine, said mounting means including a generally cylindrically-shaped member integral with the inner hoop at one end and connected to the engine frame at the other end to provide a primary support which is effective to permit relative thermal expansion of nozzle assembly components and to prevent restraining stresses that could cause cracking, a stop fixed to the outer shell of the engine and located to permit a limited axial movement of the nozzle assembly before the outer hoop engages the stop to thereby permit some part relocation in an axial direction as a result of thermal expansion and aerodynamic loads, said nozzle assembly including an engine frame mounting a turbine shaft bearing inward of the nozzle assembly and having an annular recess beneath the cylindrically-shaped member and a ring of insulation mounted in the recess beneath the cylindrically-shaped member between the nozzle assembly and the bearing, and a plurality of circumferentially spaced bolts connecting the ring of insulation and the cylindrically-shaped member and drilled to provide passageways for directing cooling air through the bolts and to the base of the adjacent turbine wheel.

3. A gas turbine engine comprising, a main frame, a rotatable shaft mounted centrally of the frame, bearing means carried by the frame and having the shaft journalled therein, a high temperature scroll mounted outward of the frame for conducting hot gases to the turbine, a jacket of insulation disposed between the inner wall of the scroll and the outer surface of the frame to provide a heat barrier between the scroll and the frame and bearing, said jacket comprising inner and outer walls and insulating material mounted between the walls, and mounting means mounting the jacket in spaced relation to the scroll and the frame to provide one cooling air passageway between the jacket and the frame and another cooling air passageway between the jacket and the scroll, said mounting means including a fixed connection to the frame adjacent the inlet end of the scroll and a free floating connection to the frame adjacent the outlet end of the scroll to prevent wall distortion of the jacket and to relieve the strain which could be developed by the heat differential across a rigidly mounted jacket.

References Cited by the Examiner

UNITED STATES PATENTS

| | | | |
|---|---|---|---|
| 2,296,702 | 9/1942 | Butler et al. | |
| 2,401,826 | 9/1946 | Halford | 253—78 X |
| 2,488,875 | 11/1949 | Morley | 253—78 X |
| 2,606,741 | 8/1952 | Howard | 253—39.15 |
| 2,628,067 | 2/1953 | Lombard | 253—78 X |
| 2,686,653 | 8/1954 | Frankel et al. | 253—39.15 |
| 2,710,523 | 6/1955 | Purvis | 253—39.15 |
| 2,789,787 | 4/1957 | Jarlborg | 253—78 X |
| 3,074,690 | 1/1963 | Henny | 253—78 |

FOREIGN PATENTS

| | | |
|---|---|---|
| 740,440 | 10/1943 | Germany. |
| 243,027 | 12/1925 | Great Britain. |

OTHER REFERENCES

German printed application of Feilden et al., S.N. 10,533, May 1956.

MARTIN P. SCHWADRON, *Primary Examiner.*

EVERETTE A. JOWELL, JR., *Examiner.*